United States Patent
Krausz et al.

(10) Patent No.: US 7,232,160 B2
(45) Date of Patent: Jun. 19, 2007

(54) PIPE CLAMP INNER SEAL

(75) Inventors: Eliezer Krausz, Tel-Aviv (IL); Avi Chiproot, Kfar-Saba (IL)

(73) Assignee: Krausz Metal Industries Ltd., Tel Aviv (IL)

(*) Notice: Subject to any disclaimer, the term of this patent is extended or adjusted under 35 U.S.C. 154(b) by 0 days.

(21) Appl. No.: 10/718,813

(22) Filed: Nov. 24, 2003

(65) Prior Publication Data

US 2004/0104576 A1   Jun. 3, 2004

(30) Foreign Application Priority Data

Dec. 2, 2002   (IL) .................................... 153222

(51) Int. Cl.
*F16L 21/00* (2006.01)
(52) U.S. Cl. .................... 285/419; 285/15; 285/373
(58) Field of Classification Search .............. 285/15, 285/373, 419; 138/99
See application file for complete search history.

(56) References Cited

U.S. PATENT DOCUMENTS

| | | | | |
|---|---|---|---|---|
| 2,776,153 A | * | 1/1957 | Smith | 277/627 |
| 2,936,186 A | * | 5/1960 | Dunmire | 285/373 |
| 3,156,489 A | * | 11/1964 | Deringer | 285/373 |
| 3,630,550 A | * | 12/1971 | Zine, Jr. | 285/235 |
| 4,409,708 A | * | 10/1983 | Hauffe | 285/373 |
| 4,583,770 A | * | 4/1986 | Kreku et al. | 285/373 |
| 4,653,782 A | * | 3/1987 | Munday | 285/373 |
| 4,664,428 A | * | 5/1987 | Bridges | 285/373 |
| 4,708,373 A | * | 11/1987 | Morriss, Jr. | 285/373 |
| 4,717,182 A | | 1/1988 | Behrens et al. | |
| 4,889,167 A | * | 12/1989 | Morris | 138/99 |
| 5,090,742 A | * | 2/1992 | Cohen et al. | 285/373 |
| 5,248,169 A | | 9/1993 | Barbe et al. | |
| 5,282,654 A | | 2/1994 | Hendrickson et al. | |
| 5,362,107 A | * | 11/1994 | Bridges | 285/15 |
| 5,383,693 A | * | 1/1995 | Shade | 285/373 |
| 5,772,257 A | | 6/1998 | Webb et al. | |
| 5,950,683 A | * | 9/1999 | Henderson et al. | 285/15 |
| 6,070,914 A | | 6/2000 | Schmidt et al. | |

* cited by examiner

*Primary Examiner*—David Bochna
(74) *Attorney, Agent, or Firm*—Pearl Cohen Zedek Latzer, LLP

(57) ABSTRACT

A sealing of pipe repair clamps is taught providing a flexible inner sheet or sleeve adapted for duty inside a pipe repair clamp to prevent leakage of the fluid to be transported in a pipeline. The inner sheet or sleeve may be used in combination with a band-type pipe clamp of various types. The clamp may also be useful for temporary or permanent repair of a leaking pipe and for connecting two pipe ends. The clamp may include, in a pipe clamp or coupling for pipes by means of a metal clamping band to surround the pipes, and a flexible inner sheet or sleeve disposed inside the clamping band, having reinforcing material bonded to or embedded in the inner sheet or sleeve to inhibit axial expansion when the inner sheet or sleeve is under compression between the pipes and the clamping band.

4 Claims, 3 Drawing Sheets

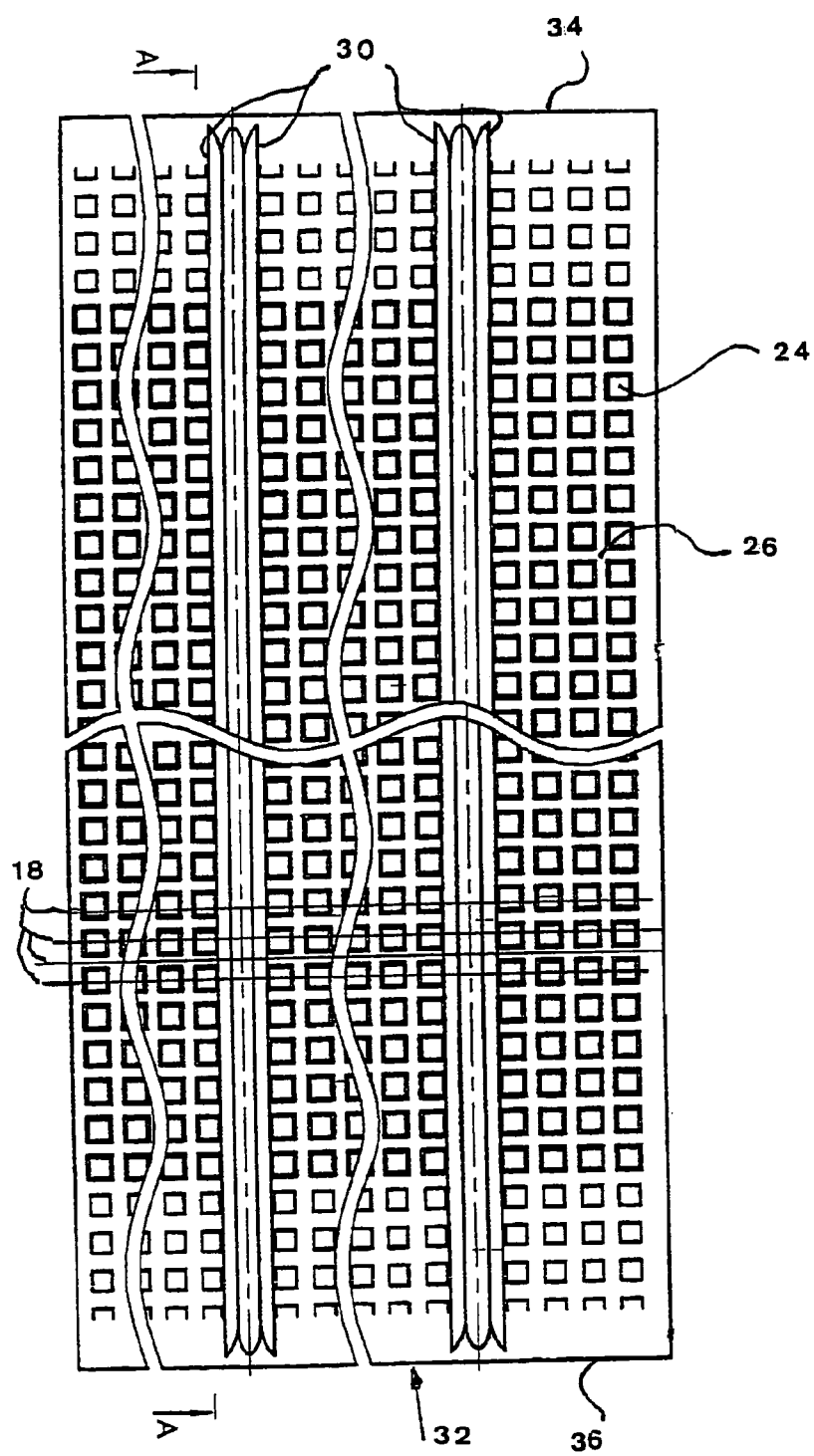
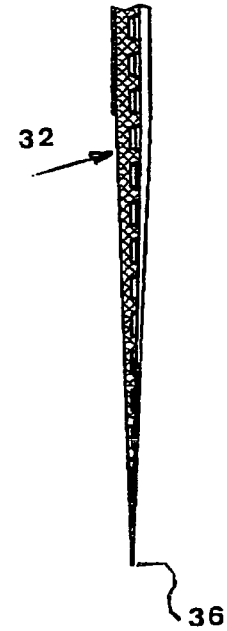
FIG. 4 a  FIG. 4 b

PIPE CLAMP INNER SEAL

CROSS-REFERENCE TO RELATED APPLICATIONS

This application claims priority of IL Patent Application No. 153222, filed Dec. 2, 2002, which is hereby incorporated by reference.

FILED AND BACKGROUND OF THE INVENTION

The present invention relates to the sealing of pipe repair clamps.

More particularly, the invention provides a flexible inner sheet or sleeve adapted for duty inside a pipe repair clamp to prevent leakage of the fluid to be transported in a pipeline. The inner sheet or sleeve of the present invention may be used in combination with a band-type pipe clamp of the type described in one of our co-pending applications, but is not limited thereto.

The clamp is also useful for temporary or permanent repair of a leaking pipe, and for connecting two pipe ends.

Pipe clamps are usually, although not always, expected to provide a liquid-proof seals in addition to their primary function of mechanically repairing a pipe or holding a pair of pipe ends together co-axially. Sealing is often provided by use of a rubber sleeve along the whole length of a tension-band type clamp or coupling. A known difficulty with seals of this type is that due to extreme pressure the rubber tends to extrude axially out of the clamp. Furthermore, the simple sheet or sleeve type of seal does not operate well, or cannot be assembled over a pipe diameter different from the nominal design diameter.

The state of the art can be assessed by review of a selection of recent US patents.

In U.S. Pat. No. 4,717,182 Behrens et al. address the joining of asbestos-cement pipes by use of a plastic coupling sleeve reinforced with glass fibers. The pipes to be joined have external grooves which are utilized by a cable-like connecting member.

A coupling intended for collection pipes used for gravitational sanitary drainage is disclosed by Barbe et al. in U.S. Pat. No. 5,248,169. A flexible elastic and reversible collar is retained inside a rigid binding ring. The arrangement is not intended or suitable for the high forces encountered by large pipe couplings.

The pipe coupling sleeve disclosed by Hendrickson in U.S. Pat. No. 5,282,654 refers to a pair of pipes, at least one of them being plastic. The design is directed at preventing damage to the plastic pipe and requires that the pipe ends have circumferential grooves.

Webb et al. disclose a coupling having a sealing sleeve in U.S. Pat. No. 5,772,257. The sealing sleeve has two sets of inwardly projecting ribs to effect sealing against the pipes. The coupling requires radial abutment surfaces for operation.

A pipe coupling able to connect pipes having unprofiled end sections is disclosed by Schmidt in U.S. Pat. No. 6,070,914. Sealing is effected by a pair of gaskets. However the clip strap has inwardly directed flanges which limits the flexibility of the device. The coupling has many components.

OBJECTS OF THE INVENTION

It is therefore one of the objects of the present invention to obviate the disadvantages of prior art flexible sealing sleeves for pipe clamps or couplings and to provide a sheet or sleeve which is suitable for use in combination with a pipe clamp having a wide diameter range.

It is a further object of the present invention to provide a sheet or sleeve which resists axial extrusion under pressure without relying on turned inwards flanges of the clamp band.

Yet a further object of the invention is to provide a sealing sheet or sleeve which effects sealing without the need for extreme pressure thereon.

SUMMARY OF THE INVENTION

The present invention achieves the above objects by providing, in a pipe clamp or coupling for pipes by means of a metal clamping band to surround said pipes, and a flexible inner sheet or sleeve disposed inside said clamping band; the improvement being the provision of reinforcing material bonded to said flexible inner sheet or sleeve or incorporating such reinforcement therein to inhibit axial expansion thereof when said inner sheet or sleeve is under compression between said pipes and said clamping band.

In a preferred embodiment of the present invention there is provided a flexible inner sheet or sleeve which carries an array of depressions over most of its inner face.

In a most preferred embodiment of the present invention there is provided a flexible inner sleeve comprising a flat mat having a first end and a second end, said first end being attached to the clamping band and said second end being free to overlap the inner surface of said mat retained in a cylindrical configuration when disposed inside a pipe clamp or coupling.

It will thus be realized that the novel sleeve of the present invention when formed as a mat can easily handle large pipe diameter variations because the overlapping end is unattached and is free to move and to increase or decrease the degree of overlap.

With regard to the depressions in the mat, these provide a two-stage degree of resistance to compression. In the first stage the walls between the depressions are compressed, providing only moderate resistance but ensuring that contact is made with all parts of the pipe ends for sealing purposes. Further compression of the sleeve leads to compression of the whole surface thereof, thus allowing the high clamping forces needed to mechanically retain the pipe ends in the coupling. High clamping forces are permissible as rubber extrusion is prevented by the textile reinforcing material bonded to the flexible inner sleeve.

In a preferred embodiment profiled sealing lips are also provided on the inner face of the sleeve, perpendicular to the axial direction to further improve the sealing capability of the sleeve. These sealing lips are molded integrally with the sleeve to reduce costs and assembly time.

While the sealing sleeve of the present invention is particularly suited for use in combination with the wide-range band-type pipe clamps which is the subject of one of our co-pending applications, the sleeve will improve the performance of any type of pipe clamp or coupling into which it is assembled.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings:

FIG. 4a is a fragmented plan view of a most preferred embodiment showing a mat which takes up a cylindrical form when fitted into a pipe clamp; and FIG. 4b is a view of a side view of the a mat end taper, shown as a section taken at AA in FIG. 4a.

FULL DESCRIPTION OF THE PREFERRED EMBODIMENT

Figure 1A:
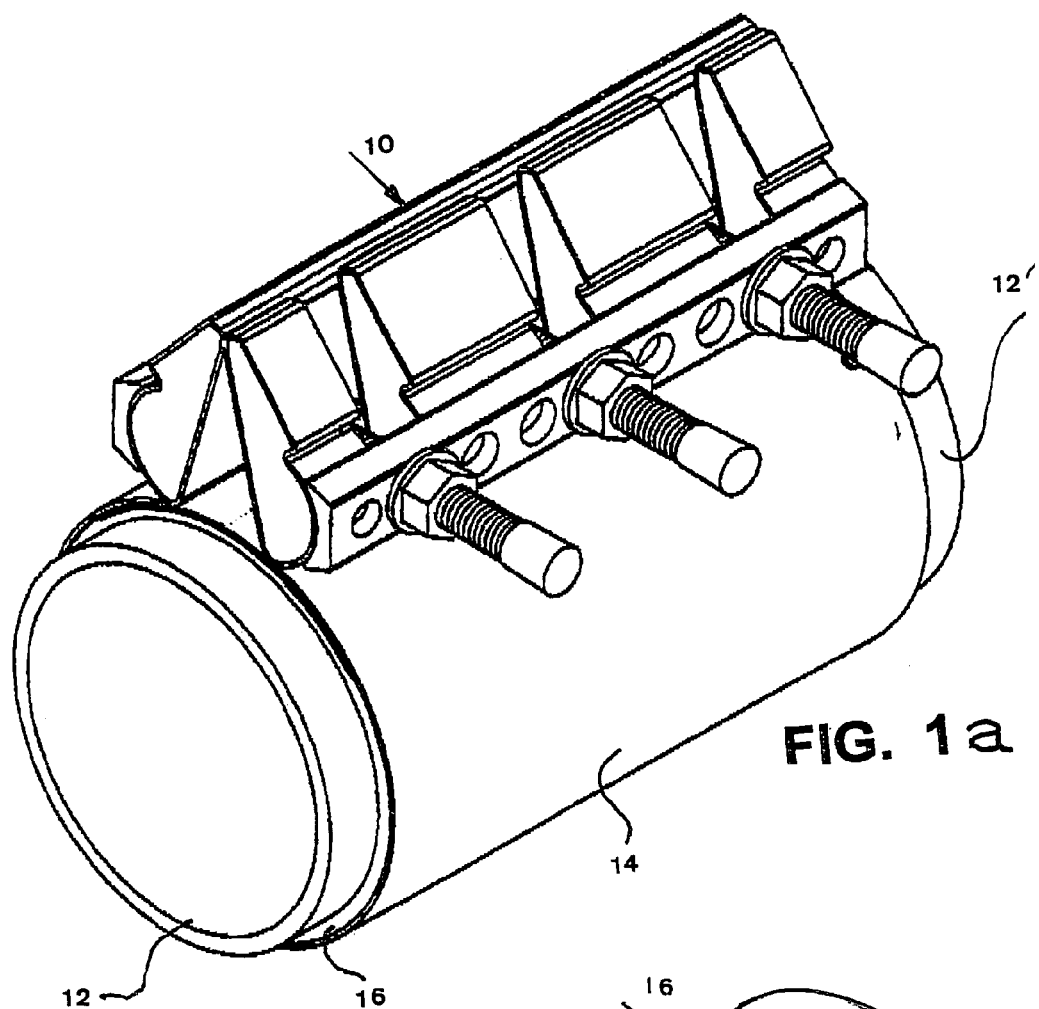
FIG. 1a is a perspective view of a sleeve shown between a pipe clamp and a pipe, according to the invention.

There is seen in FIG. 1a a pipe clamp 10 for pipes 12, 12' for repair sealing relationship by means of a metal clamping band 14 to surround the pipes.

A flexible inner sealing sleeve 16 is disposed inside the clamping band 14.

Figure 1B:
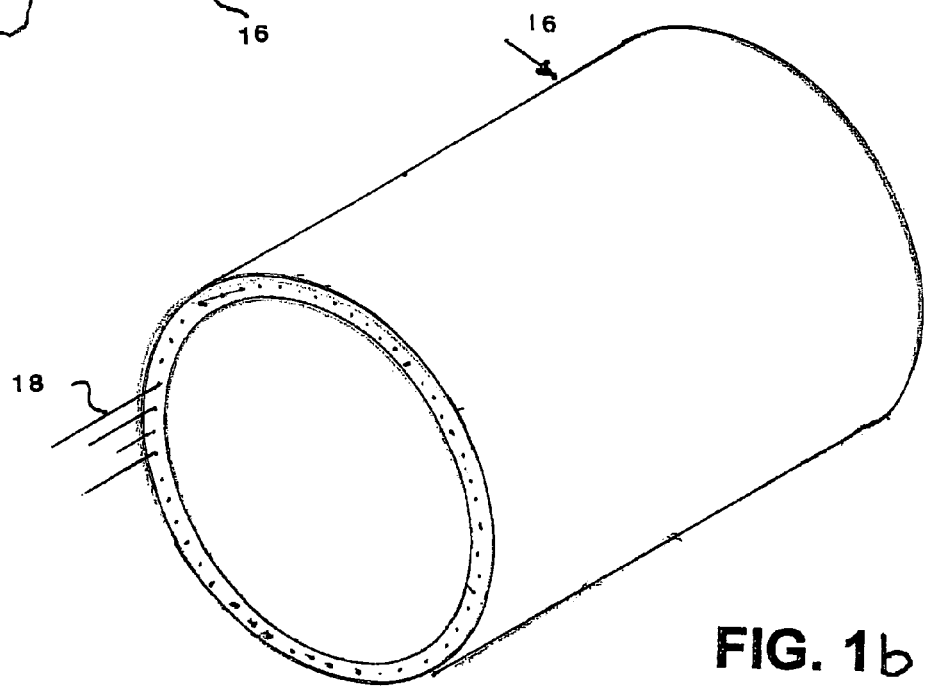
FIG. 1b is a perspective view of the sleeve.

As seen in the detail view in FIG. 1b, a reinforcing material 18, seen in FIG. 1b, is vulcanized or bonded to the flexible inner sleeve 16 to inhibit sleeve axial expansion when the inner sleeve is under compression between the pipes 12, 12' being coupled and the clamping 14 band of the clamp. Advantageously the reinforcing material 18 is an aramide fiber, for example Kevlar™. Aramide fibers are stiff and strong. The reinforcing material 18 is preferably molded inside the sleeve, as shown in the figure. It is however possible to bond the material 18 to the outer diameter of the sleeve. It is within the scope of the invention to embed a netting into the sleeve made of metal or nylon or textile or the like.

The sleeve 16 is suitably made of a rubber (for example E.P.D.M., Butyl, Styrene butadiene or neoprene) or of a thermoplastic elastomer (for example polyurethane or an olefin). The final selection of material depends on meeting the compatibility requirements of the fluid to be carried in the pipeline, on the operating temperature range, and on cost factors. A natural rubber can be used if the pipeline carries water, assuming that the operating temperature range will be within −30° C. to +80° C.

With reference to the rest of the figures, similar reference numerals have been used to identify similar parts.

Figure 2:
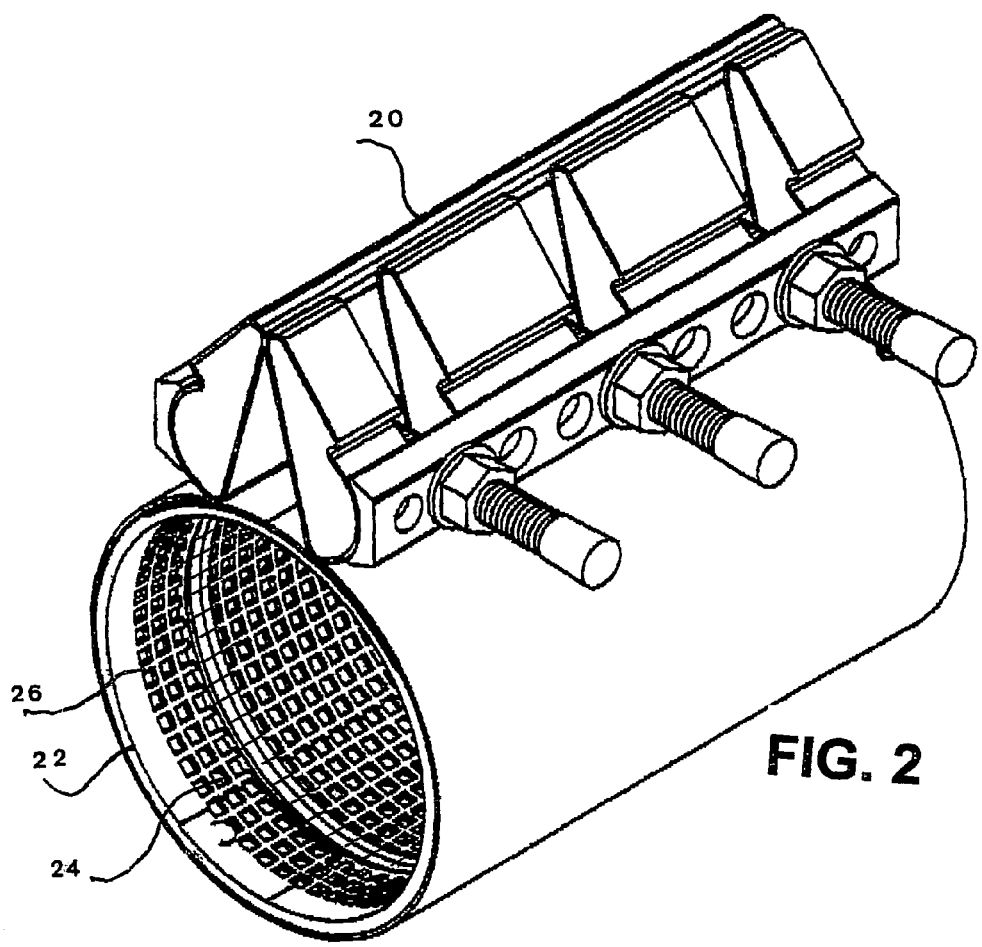
FIG. 2 is a perspective view of a preferred embodiment of the sleeve attached to a pipe clamp.

Referring now to FIG. 2, there is seen a pipe clamp 20 provided with a further embodiment of a flexible inner sleeve 22. The sleeve carries an array of depressions 24, best seen in FIG. 3a, over most of its inner face. The walls 26 between the depressions 24 seal the pipes to be held in the clamp, while the smooth continuous section 25 of the sleeve 22, underneath the depressions 24 allows the application of high clamping forces because the whole area of sleeve provides resistance.

Figure 3A:
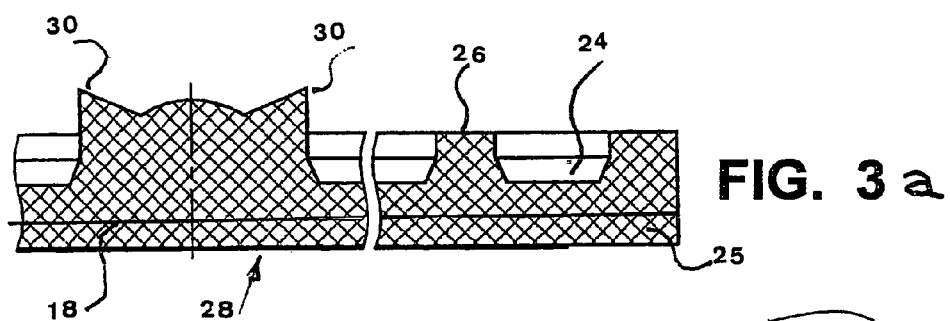
FIG. 3a is a sectional detail view, greatly enlarged, of a further preferred embodiment, showing an integral seal member.
Figure 3B:
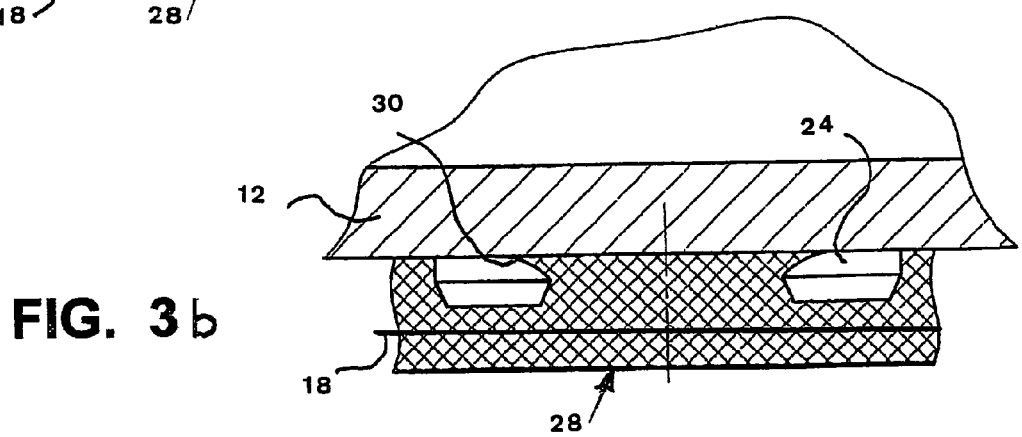
FIG. 3b is similar to FIG. 3a, illustrating the seal member in use being pressed against a pipe.

FIG. 3a illustrates a detail of a flexible inner sleeve 28 provided with sealing lips 30 on its inner face to contact the pipe 12 when in use. The sealing lips 30 are integrally molded with the sleeve 28, thereby reducing manufacturing costs and eliminating an assembly task. The lips being perpendicular to the axial direction of the coupling. FIG. 3b shows the sealing lips 30 pressed against a pipe 12 which provides improved sealing capability.

Seen in FIG. 4a is pipe clamp flexible inner sleeve comprising a flat mat 32. The mat has a first end 34 and a second end 36. The first end 34 is arranged to be attached inside the band of a pipe clamp, for example the clamp 10 seen in FIG. 1. The second end 36 is free to overlap the inner surface of the mat 32, when in use, thus being able to accommodate large variations in pipe diameters by change of the degree of overlap. The mat 32 is retained in a cylindrical configuration when disposed inside the band of a pipe clamp.

In order to obviate the danger of leakage adjacent to the ends 34, 36 of the mat 32, the mat ends are tapered in a peripheral direction, as seen in FIG. 4b.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

We claim:

1. In a pipe clamp or coupling for pipe repair or for sealing relationship of two pipes by means of a metal clamping band to surround at least one of said pipes, and a flexible inner sleeve disposed inside said clamping band, said flexible inner sleeve carries an array of depressions over most of its inner face, the improvement comprising a reinforcing material embedded within said inner sleeve, fibers of said reinforcing material are parallel to axis of said pipe clamp or coupling to inhibit axial expansion of said inner sleeve when said inner sleeve is under compression between said at least one of said pipes and said clamping band, wherein said flexible inner sleeve is provided with sealing lips protruding from said inner face and integral to said flexible inner sleeve on its inner face to contact said at least one of said pipes, said sealing lips are made to form circumferential sealing ring around said at least one of said pipes, and wherein said sealing lips are formed with edges which bent down and sideward when in contact with said at least one of said pipes to increase sealing of said sealing lips when liquid fills depressions on the sides of said sealing lips.

2. The improvement to a pipe clamp or coupling as claimed in claim 1, wherein said reinforcing material is an aramide fiber.

3. The improvement to a pipe clamp or coupling as claimed in claim 1, wherein said flexible inner sleeve comprises a flat mat having a first end and a second end, said first end being attached to said band and said second end being free to overlap the inner surface of said mat retained in a cylindrical configuration when disposed inside said band.

4. The improvement to a pipe clamp or coupling as claimed in claim 1, wherein said ends of said flexible inner sleeve are tapered in a peripheral direction.

* * * * *